(12) United States Patent
Lo et al.

(10) Patent No.: US 11,537,911 B2
(45) Date of Patent: Dec. 27, 2022

(54) MACHINE LEARNING TECHNIQUES TO NURTURE CONTENT CREATION

(71) Applicant: Microsoft Technology Licensing, LLC, Redmond, WA (US)

(72) Inventors: Chun Lo, Sunnyvale, CA (US); Emilie De Longueau, San Francisco, CA (US); Ankan Saha, San Francisco, CA (US); Shaunak Chatterjee, Sunnyvale, CA (US); Ye Tu, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 16/775,620

(22) Filed: Jan. 29, 2020

(65) Prior Publication Data

US 2021/0232942 A1 Jul. 29, 2021

(51) Int. Cl.
*G06N 20/00* (2019.01)
*G06N 5/04* (2006.01)

(52) U.S. Cl.
CPC ............... *G06N 5/04* (2013.01); *G06N 20/00* (2019.01)

(58) Field of Classification Search
CPC ...................................................... G06N 20/00
See application file for complete search history.

(56) References Cited

U.S. PATENT DOCUMENTS

2017/0193531 A1* 7/2017 Fatourechi .......... G06F 16/9535
2018/0040029 A1* 2/2018 Zeng .................. G06Q 30/0277

* cited by examiner

*Primary Examiner* — Michael H Hong
(74) *Attorney, Agent, or Firm* — NDWE, LLP

(57) ABSTRACT

Techniques for nurturing content creation are provided. In one technique, a particular user is identified. Candidate entities are identified based on one or more attributes of the particular user. For each candidate entity, a feedback sensitivity measure of content creation of the candidate entity is determined. The feedback sensitivity measure is generated based on an amount of feedback, from other users, to content that the candidate entity has created. A score is then generated for the candidate entity based on the measure. A ranking of the candidate entities is determined based on the score of each candidate entity. A subset of the candidate entities is selected based on the ranking. The subset of the candidate entities is transmitted over a computer network to be presented on a computing device of the particular user.

20 Claims, 5 Drawing Sheets

MACHINE LEARNING TECHNIQUES TO NURTURE CONTENT CREATION

TECHNICAL FIELD

The present disclosure relates to machine learning and, more particularly, to using machine learning techniques to balance content creation and content follows.

BACKGROUND

The Internet has enabled the ability for people to communicate and share electronic content instantly regardless of geographical distance. One way to connect people online is through an online network service that allows people to register (using their respective computing devices) with the network service, create profiles, and send connection invitations to others who they discover through the network service. Once two individuals are connected online, they may leverage the network service to message one another and/or share content with one another.

However, an individual might not want to formally connect with others online because doing so may allow those others to access his/her information or spam him/her with unwanted information. Therefore, an online network service might allow a first user to follow a second user without the two users being officially connected. An advantage of this approach is that the second user gives, to the first user, limited access to the second user's information while the first user is able to view (and/or receive notifications about) content published or posted by the second user. In order to encourage more users of the network service to follow other users of the network service, the network service might recommend, to each individual user, one or more other users to follow.

One approach for recommending users is to identify users that have the most followers on the network service and recommend those users to other users of the network service. However, this approach does not take into account the interests of the viewing users (or potential followers) or the content of the content creators (or potential followees to the potential followers). Therefore, this approach is unlikely to provide relevant recommendations to users of the network service, resulting in poor user experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
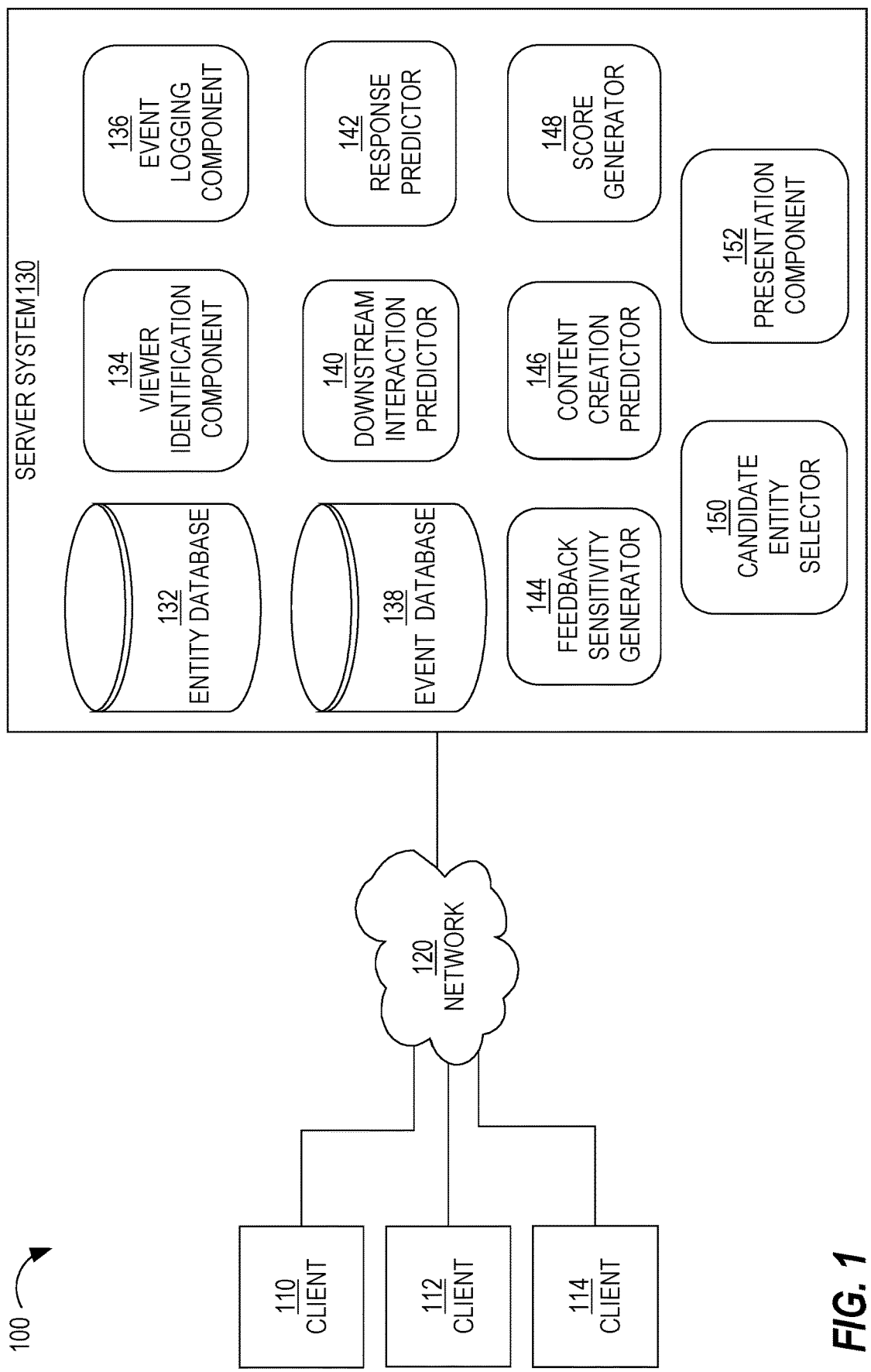
FIG. 1 is a block diagram that depicts an example system for generating follow recommendations for a user of an online network service, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method of nurturing content creation using machine learning are provided. In one technique, when determining which of multiple candidate entities to present to a particular user as candidates to follow online, a feedback sensitivity measure associated with each candidate entity is determined. The feedback sensitivity measure is different for different candidate entities. The feedback sensitivity measure is based on a candidate entity receiving feedback (e.g., likes, comments, shares) on content that the candidate entity has created/uploaded/posted or will create/upload/post. Thus, the feedback sensitivity measure may be based on how much feedback (from current followers) the candidate entity has received and/or how much feedback (from current and, optionally, future followers) the candidate entity is predicted to receive in the future. The higher the feedback sensitivity measure of a candidate entity, the higher the candidate entity will be ranked relative to other candidate entities, all else being equal.

In a related technique, a machine-learned model is used to generate a score for a candidate entity indicating a likelihood that the candidate entity will create content given an amount of feedback that the candidate entity is expected to receive. The score is used as input to compute the feedback sensitivity measure.

Embodiments improve computer-related technology, specifically technology for recommending content creators (or followees) to users of an online network service that allows users to follow entities. In another approach, ranking content creators focuses only on the interests of potential followers. In contrast, embodiments also consider the interests of content creators, who are as important as followers in a content follow ecosystem. Embodiments improve the number of potentially high-quality followers in content creators' (follow) networks.

Such improvement may be made possible using one or more machine-learned models to identify feedback sensitive content creators (who are likely to produce more content if they receive more feedback) and their corresponding feedback providers. In follow recommendations to feedback providers (or potential followers), feedback sensitive content creators will be given a higher ranking with proper tradeoff between interests of the potential followers and interests of content creators. By expanding a feedback-sensitive content creator's network to more potential feedback providers, such a content creator is more likely to receive more feedback and create additional content as a result.

System Overview

FIG. 1 is a block diagram that depicts an example system 100 for generating follow recommendations for a user of an online network service, in an embodiment. System 100 includes clients 110-114, network 120, and server system 130.

Each of clients 110-114 is an application or computing device that is configured to communicate with server system 130 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 and that executes within a web browser running on a computing device. Each of clients 110-114 may be implemented in hardware, software, or a combination of hardware and software. Although only three clients 110-114 are depicted, system 100 may include many more clients that interact with server system 130 over network 120.

Network 120 may be implemented on any medium or mechanism that provides for the exchange of data between clients 110-114 and server system 130. Examples of network 120 include, without limitation, a network such as a Local Area Network (LAN), Wide Area Network (WAN), Ethernet or the Internet, or one or more terrestrial, satellite or wireless links.

Server system 130 includes an entity database 132, a viewer identification component 134, an event logging component 136, an event database 138, a downstream interaction predictor 140, a response predictor 142, a feedback sensitivity generator 144, a content creation predictor 146, a score generator 148, a candidate entity selector 150, and a presentation component 152. Each of these elements of server system 130 that described in more detail herein may be implemented in hardware, software, or a combination of hardware and software.

Although depicted as a single element, server system 130 may comprise multiple computing elements and devices, connected in a local network or distributed regionally or globally across many networks, such as the Internet. Thus, server system 130 may comprise multiple computing elements other than the depicted elements.

Server system 130 may host an online network service (e.g., such as the network service provided by LinkedIn) through which clients 110-114 request and receive content. Alternatively, another computer system hosts the online network service. If the latter, then server system 130 and the other computer system may be communicatively coupled, such as in the same local network and/or may routinely share data, despite any geographical distance between the two systems.

Followers and Content Creators

A follower is a (e.g., registered) user of the online network service. The user becomes a follower of a specific entity when the user has elected to receive, through the online network service, content created or uploaded by the specific entity to the online network service. The specific entity is referred to herein as a "content creator" and a "followee." The specific entity may be another user, an organization (e.g., a company), a group, or hashtag. Thus, if the specific entity is a user, then the specific entity may also be a follower of other entities, not just a followee.

Though a hashtag is simply a set of characters (i.e., a pound sign followed by text) and not an actor, a hashtag may be considered a content creator or followee for purposes of this application. Thus, a user may follow a hashtag and receive content (or a notification thereof) whenever someone posts content that includes, or is associated with, the hashtag.

The specific entity is also referred to as a "candidate entity" or "candidate content creator." The candidate content creator may already be a content creator in that the content creator currently has one or more followers. However, a content creator is a candidate with respect to a user that is not yet a follower of the content creator. Similarly, a user may be a "potential follower" even if the user is currently a follower of one or more content creators. Such a user is a potential follower with respect to a specific content creator that the user is not currently following.

A pair of users that consists of a follower and a content creator that the follower follows is referred to herein as a "follow connection." A set of followers of a content creator is referred to herein as the content creator's "follow network."

A user may elect to receive the content by selecting (e.g., using his/her finger on a touchscreen or using a pointer of a mouse control device) a graphical "Follow" button (or other graphical element that signifies the intention to "follow" the specific entity) that is adjacent to a name and/or image of the specific entity.

Following a content creator by "receiving content" from the content creator may occur in different ways. For example, if a user follows a content creator, then, whenever the content creator posts or uploads content (e.g., a content item), the user may be notified immediately through one or more content delivery channels. Such a notification may come in the form of an email, a text message, a notification to a native software application installed on the user's computing device, or a notification to a web application that is executing within a web browser that is installed on the computing device. If the client application (whether native or web) is open at the time the computing device receives the notification, then the notification may be presented immediately over any other content the client application was presenting at the time of the receipt. Alternatively, an icon may appear adjacent to a notification tab indicating that a notification is available.

If the client application is not open at the time the computing device receives the notification but the computing device, then the notification may be presented over other content that the computing device is currently presenting through one or more other applications.

Another example of receiving content from a content creator as a result of following the content is receiving the content in a scrollable feed that is provided by the online network service and tailored to the follower. The scrollable feed includes many content items, some of which may be sponsored (e.g., advertisements) while others may be non-sponsored or "organic." If a content creator posts content and a follower follows the content creator, then the content may appear highly ranked in the scrollable feed, such as one of the first five positions.

Another example of receiving content from a content creator as a result of following the content is receiving the content in a portion of a user interface that is dedicated to content creators that the follower follows. For example, a user interface tailored to a specific follower includes multiple tabs, one of which is for presenting content from content creators to which the follower follows. (Other tabs of the user interface may allow the follower to scroll through a feed, search existing connections, search users who may be potential future connection, and view and compose messages to other users of the online network service.) Such a "Follow" tab may be updated to indicate that content from a content creator is recently available. Alternatively, there may be no visual indication of such content. Instead, the follower might have to select the "Follow" tab in order to view content from the content creator and from other content creators that the follower follows.

Entity Database

Entity database 132 stores multiple entity profiles. Each entity profile in entity database 132 is provided by a different user. Example entities include users, groups of users, organizations (e.g., companies, associations, government agencies, etc.), and hashtags. Each entity profile is provided by a different user or group/organization representative.

An organization profile may include an organization name, a website, one or more phone numbers, one or more email addresses, one or more mailing addresses, a company size, a logo, one or more photos or images of the organization, an organization size, and a description of the history and/or mission of the organization.

A user profile may include a first name, last name, an email address, residence information, a mailing address, a phone number, one or more educational/academic institutions attended, one or more academic degrees earned, one or more current and/or previous employers, one or more current and/or previous job titles, a list of skills, a list of endorsements, and/or names or identities of friends, contacts, connections of the user, and derived data that is based on actions that the user has taken. Examples of such actions include jobs to which the user has applied, views of job postings, views of company pages, private messages between the user and other users in the user's social network, public messages that the user posted and that are visible to users outside of the user's social network (but that are registered users/members of the social network provider), and feedback provided on other entities' content (e.g., blogs, posts, articles, comments), such as likes, shares, and comments.

Some data within a user's profile (e.g., work history) may be provided by the user while other data within the user's profile (e.g., skills and endorsements) may be provided by a third party, such as a "friend," connection, or colleague of the user.

Server system 130 (or the online network service) may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

Event Logging

Event logging component 136 logs or stores one or more types of events, with respect to user interaction with various content items, across clients 112-116 (and other clients not depicted). For example, server system 130 determines whether a content item that server system 130 (or an affiliated system) delivered is presented at (e.g., displayed by or played back at) a client device. Such an "event" is referred to as an "impression." As another example, server system 130 determines whether a user interacted with a content item that server system 130 (or an affiliated system) delivered to a client device of the user. Examples of "user interaction" include a selection (or "click") or viewing two seconds of a video. Server system 130 stores such data as event data in event database 138, such as an impression data set and/or an interaction data set. Logging such events allows server system 130 to track how well individual content items perform and how well content item selection components (e.g., downstream interaction predictor 140, response predictor 142, a feedback sensitivity generator 144, content creation predictor 146, and score generator 148) perform.

For example, event logging component 136 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if server system 130 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. If impression data items are generated and processed properly, an interaction data item should be associated with an impression data item that corresponds to the interaction data item. From interaction data items and impression data items associated with a content item, server system 130 may calculate an observed (or actual) user interaction rate (e.g., CTR) for the content item. Also, from interaction data items and impression data items associated with a content creator (or multiple content items from the same content creator), server system 130 may calculate a user interaction rate for the content creator. Additionally, from interaction data items and impression data items associated with a particular topic or subject matter, server system 130 may calculate a user interaction rate for the particular topic or subject matter. Similarly, from interaction data items and impression data items associated with a class or segment of users (or users that satisfy certain criteria, such as users that have a particular job title), server system 130 may calculate a user interaction rate for the class or segment. In fact, a user interaction rate may be calculated along a combination of one or more different user and/or content item attributes or dimensions, such as geography, job title, skills, content creator, certain keywords in content items, etc.

Content Items

Server system 130 (or an affiliated system) causes content items to be transmitted over network 120 to clients 112-116 and displayed on screens associated with clients 112-116. A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

The subject matter of a content item may vary from one type to another. Examples of a content item include an article, a content posting, a recommendation, a search result, and an advertisement. A content item may be provided by an organization (such as a company in the business of selling goods or services) or a person that is a registered user of an online network service (e.g., LinkedIn). Examples of articles include news articles, tech articles, real estate articles, how-to articles, etc. Examples of content postings include job postings and postings about what is on the mind of an individual registered user. Examples of recommendations include people recommendations, company recommendations, job recommendations, and follow recommendations. Examples of search results are search results about people, organizations, hashtags, courses, groups, and/or events.

Feedback

As alluded to above, event logging component 136 tracks events generated in response to user interactions with respect to content items, such as follow recommendations and content items that content creators upload for distribution to their respective follow networks. Example user interactions such as impressions, clicks, follows, likes, comments, and shares. In one approach, only "viral" actions, such as likes, comments, and shares are considered as feedback on content items that content creators post. Event logging component 136 stores the events (indicating the feedback) in event database 138.

Event logging component 136 may also aggregate information on a per content creator basis and, optionally, over different periods of time. For example, for content creator A, event logging component 136 analyzes all events associated with feedback from that content creator's follow network (e.g., by first identifying all events that include an identifier for content creator A as the creator of the content that received feedback) and generates (and stores in a record associated with content creator A) a total number of instances of feedback received for content created/uploaded/posted by content creator A. As a related example, event logging component 136 determines a total number of instances of each type of feedback and stores those totals in association with content creator A. For example, content creator A may have received a total of 83 instances of feedback, 21 of which are likes, 37 of which are comments, and 25 of which are shares.

As another example, for follower B, event logging component 136 analyzes all events associated with feedback provided by follower B (e.g., by first identifying all events that include an identifier for follower B as the provider of the feedback) and generates (and stores in a record associated with follower B) a total number of instances of feedback received from follower B. As a related example, event logging component 136 determines a total number of instances of feedback for different content creators upon whose content follower B provided feedback and stores those totals in association with follower B. For example, follower B may have provided of a total of 54 instances of feedback, 8 of which were for content created by content creator C, 19 of which were for content created by content creator D, and 27 of which were for content created by content creator E.

Using Past Feedback of a Content Creator for Scoring

In an embodiment, when ranking candidate content creators that may be presented to a user, the feedback that each candidate content creator has received relative to content that s/he created/uploaded/posted is considered in performing the ranking. For example, the more feedback that a candidate content creator has received in the recent past, the lower a score for the candidate content creator, which score is used to rank the candidate content creator relative to other candidate content creators. Conversely, the less feedback that a candidate content creator has received in the recent past, the higher a score for the candidate content creator.

The score may be based on multiple factors, one of which is feedback. A feedback sensitivity function may be used that defines a logarithmic relationship between feedback and content creation. Generally, for content creators that receive little feedback for their content, if they receive even a little more feedback for their content, then they might create more content than they would otherwise create. Also, for content creators that receive a lot of feedback for their content, if they receive more feedback for their content, then they might not create more content than they would otherwise create. The feedback sensitivity function may be generated based on historical data that shows changes in amount of feedback that a content creator receives and resulting content creation from the content creator; thus, identifying changes in content creation in light of increased feedback. Using such a feedback sensitivity function to generate a score for a candidate content creator may be suitable for many scenarios and may result in more relevant follow recommendations and increased content creations that other approaches. However, as described in more detail herein, additional factors may be taken into account to generate a more relevant score for a candidate content creator. Also, some of the additional factors may be personalized, resulting in a more accurate feedback sensitivity measure compared to the non-personalized feedback sensitivity function described herein. For example, content creator A may be more sensitive to feedback than content creator B even though both of them have the same amount of received feedback in the recent past. Thus, content creator A may be ranked higher than content creator B in a list of ranked candidate content creators that is presented to a potential follower of content creators A and B.

Multiple Objectives

In an embodiment, generating a score for a candidate content creator takes into account multiple objectives: optimizing the value of a follow connection to the potential follower and optimizing the value of the follow connection to the candidate content creator. If both values are relatively high for a potential follow connection, then the score for the candidate content creator will be relatively high and the candidate content creator is more likely to be ranked high in a follow recommendation list or set of candidate content creators. (A follow recommendation list or set may include a single follow recommendation or multiple follow recommendations.) Conversely, if both values are relatively low for a potential follow connection, then the score for the candidate content creator will be relatively low and the candidate content creator is likely to be ranked low in a list or set of candidate content creators, or left out of the list or set altogether. If only one of the two values is relatively high for a potential follow connection, then the magnitude of each value will determine where the candidate content creator will be listed in the follow recommendation list or set or even whether the candidate content creator will be listed in the follow recommendation list or set.

Predicting Online Behavior with Respect to Content Creation and Consumption

In order to calculate one or both of these objective values to derive a relevant score for a candidate content creator, multiple predictions may be made, including a prediction of whether a potential follower will select a follow recommendation for the candidate content creator, whether the candidate content creator will create additional content in the future, whether the potential follower will provide feedback to the candidate content creator, and how much feedback the potential follower might provide to the candidate content creator (or an expected number of interactions (e.g., impressions, clicks, likes, comments, shares) provided by the potential follower to content from the candidate content creator after the potential follower follows the candidate content creator). Such predictions may be performed in a number of ways. For example, rules may be established that count certain activities and certain profile attributes for each user, each count corresponding to a different score and, based on a combined score, determine whether the user will select a particular follow recommendation or provide feedback to a corresponding candidate content creator that the user follows. For example, a user that has a job title in common with a candidate content creator may result in three points, the user providing two instances of feedback in the last week may result in five points (bringing the total to eight points), and the user posting content about a particular topic in common with content posted by the candidate content creator may result in ten points (bringing the total to eighteen points). If a user reaches twenty points, then it is predicted that the user will provide feedback with the candidate content creator.

Rules may be determined manually by analyzing characteristics of users who clicked on previous follow recommendations and/or provided feedback to existing content creators to which the users follow. For example, it may be determined that 56% of users who selected a follow recommendation in the past week, visited the website hosted by server system 130 on a daily basis, and has read three articles about a particular topic ultimately provided feedback on content from content creators pertaining to the particular topic.

A rule-based prediction model has numerous disadvantages. One disadvantage is that it fails to capture nonlinear correlations. Another issue with a rule-based prediction model is that the hand-selection of values is error-prone, time consuming, and non-probabilistic. Hand-selection also allows for bias from potentially mistaken business logic. A third disadvantage is that output of a rule-based prediction model is an unbounded positive or negative value. The output of a rule-based prediction model does not intuitively map to the probability of following a candidate entity or probability of providing feedback. In contrast, machine learning methods are probabilistic and therefore can give intuitive probability scores.

Machine-Learned Models

In an embodiment, one or more prediction models are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with followers and followees (or content creators). The statistical model is trained based on multiple attributes (or factors) described herein. In machine learning parlance, such attributes are referred to as "features." To generate and train a statistical prediction model, a set of features is specified and a set of training data is identified.

Embodiments are not limited to any particular machine learning technique for generating a prediction model. Example machine learning techniques include linear regression, logistic regression, random forests, naive Bayes, and Support Vector Machines (SVMs). Advantages that machine-learned prediction models have over rule-based prediction models include the ability of machine-learned prediction models to output a probability (as opposed to a number that might not be translatable to a probability), the ability of machine-learned prediction models to capture non-linear correlations between features, and the reduction in bias in determining weights for different features.

A machine-learned prediction model may output different types of data or values, depending on the input features and the training data. For example, training data may comprise, for each user, multiple feature values, each corresponding to a different feature, such as features pertaining to attribute values listed in the user's profile and features pertaining to online behavior of the user. In order to generate the training data, information about each user is analyzed to compute the different feature values. In this example, depending on the machine-learned model trained, the dependent variable of each training instance may be whether a user selected a follow recommendation pertaining to a candidate content creator. For another machine-learned model, the dependent variable of each training instance may be a number of instances of feedback that a follower provided to content from a followee (or content creator) that the follower follows.

Initially, the number of features that are considered for training may be significant. After training a prediction model and validating the prediction model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will with little predictive power may be removed from the training data. Removing such features can speed up the process of training future prediction models and making predictions.

Viewer Identification Component

In an embodiment, in order to generate a score for a follow recommendation, information about the potential follower (or viewer) is identified and leveraged. Viewer identification component 134 identifies a viewer to which candidate content creators may be presented. For example, viewer identification component 134 determines that server system 130 receives a request for follow recommendations from one of clients 110-114. Viewer identification component 134 identifies an identifier within the request. The identifier may be a member or user identifier, a browser identifier, an IP address, or a device identifier, such as a MAC address. Thus, the identifier included in the request may directly identify a particular user or may be used to lookup an identifier for the particular user. For example, a browser identifier may be associated with a particular user identifier.

Alternative to receiving a request from a client device, viewer identification component 134 may be triggered in response to one or more other criteria, such as the lapse of a particular period of time. For example, a set of candidate entities is identified for a particular user on a daily basis, such as in an email or regardless of whether the particular user visits a website hosted by (or otherwise affiliated with) server system 130 or logs into server system 130 (e.g., using a web application). Thus, the set of candidate entities may be identified and available in anticipation of the particular user visiting the website or logging in.

Information about the particular user may be retrieved (using the user identifier) from entity database 132. Such information may include profile data and online behavior data reflecting a history of online actions that the particular user performed, such as the number of instances of feedback that the particular user provided within one or more different windows of time (e.g., the last week, the last two weeks, and the last month).

Downstream Interaction Predictor

In an embodiment, a score for a follow recommendation (or a candidate content creator that corresponds to the follow recommendation) is based on a prediction of whether or how much a potential follower will interact with content produced or created by the candidate content creator (and published through server system 130 or an affiliated system). Such a prediction is generated by downstream interaction predictor 140. Downstream interaction predictor 140 may implement a rules-based model or a machine-learned model. Example factors or features that downstream interaction predictor 140 takes into account to generate the prediction include attributes of the potential follower, attributes of the candidate content creator (e.g., a number of content items created (and posted) by the candidate content creator in the past), a number of shared attributes between the two entities, whether any topics of interest of the potential follower match topics of content previously produced by the candidate content creator, and the extent of previous feedback of the potential follower to other content creators that the potential follower currently follows.

If downstream interaction predictor 140 implements a machine-learned model, then the training data that is used to generate the machine-learned model comprises multiple training instances or samples, each of which correspond to follow connection (or a follower and a followee). Thus, a training instance includes attributes of a follower, attributes of a followee, and data about previous feedback from the follower to content created by the followee.

The previous feedback data is used as a label or dependent variable. Such previous feedback data may be (a) a single number or value representing the total number of feedback instances provided by the follower to content from the followee or (b) multiple numbers or values corresponding to different types of feedback. The previous feedback data may be limited to feedback that was received from the follower during a certain period of time (e.g., the last week or the first week after the follow connection was created). Alternatively, the previous feedback data is not limited to any particular time period.

When training a model based on the training data, coefficients or weights are learned for the different features of the model. Thereafter, given values for attributes of a potential follower and attributes of a candidate content creator, the machine-learned model computes a prediction of the estimated downstream interaction (e.g., a single value for feedback of all types or multiple values for different types of feedback) that the potential follower might give to content created by the candidate content creator in the future.

Response Predictor

In an embodiment, a score for a follow recommendation (or a candidate content creator that corresponds to the follow recommendation) is based on a prediction of whether the potential follower will respond to content provided by the candidate content creator. Such a prediction is generated by response predictor 142. Response predictor 142 may implement a rules-based model or a machine-learned model. Example factors or features that response predictor 142 takes into account to generate the prediction may be the same or similar to the factors taken into account by downstream interaction predictor 140, such as attributes of the potential follower, attributes of the candidate content creator (e.g., a number of content items produced/created by the candidate content creator in the past), a number of shared attributes between the two entities, whether any topics of interest of the potential follower match topics of content previously produced by the candidate content creator.

If response predictor 142 implements a machine-learned model, then the training data that is used to generate the machine-learned model comprises multiple training instances or samples, each of which correspond to follow connection (or a follower and a followee). Thus, a training instance includes attributes of a follower, attributes of a followee, and data about whether the follower provided feedback to content created by the followee. In a related embodiment, each training instance corresponds to specific content that a followee provided and that was eventually presented to the follower (e.g., as determined by event logging data). Thus, the training data may include multiple training instances that correspond to the same follow connection, but correspond to different content items (from the followee) that were presented to the follower.

The previous feedback data is used as a label or dependent variable. Such previous feedback data may be a single value, such as a 0 or a 1: 1 representing that the follower provided feedback to (e.g., specific) content of the followee, and 0 representing that the follower did not provide feedback to (e.g., the specific) content of the followee. In one embodiment, the training instances are limited to situations in which the followee generated content for the follower to follow; thus, there was an opportunity for the follower to consume content produced by the followee. In an alternative embodiment, the training instances are not so limited.

When training a model based on the training data, coefficients or weights are learned for the different features of the model. Thereafter, given values for attributes of a potential follower and attributes of a candidate content creator, the machine-learned model computes a prediction (or probability) of the potential follower providing feedback to content created by the candidate content creator in the future.

Feedback Sensitivity Generator

In an embodiment, a score for a candidate content creator is based on (1) an estimation of future downstream interactions between the candidate follower and the candidate content creator and (2) a probability of the candidate follower providing feedback to content provided by the candidate content creator (e.g., in the future, after a follow connection is created). In a related embodiment, that probability is combined (e.g., multiplied) by a feedback sensitivity measure of the candidate content creator. Thus, a score for a candidate content creator is $\alpha EDSI_{i,j} + \beta pResponse_{i,j} * FSM_j$, where $EDSI_{i,j}$ is the estimated downstream interaction between follower i and follow j, $pResponse_{i,j}$ is a probability of follower i giving feedback to followee j, $FSM_j$ is a feedback sensitivity measure of followee j, and $\alpha$ and $\beta$ are weights or coefficients, which may be manually tuned or automatically tuned.

Feedback sensitivity generator 144 generates a feedback sensitivity measure (FSM) for each candidate content creator of multiple candidate content creators. The feedback sensitivity measure is different for different candidate content creators. The feedback sensitivity measure is based on a candidate content creator receiving feedback (e.g., likes, comments, shares) on content that the candidate content creator has created/uploaded/posted or will create/upload/post. Thus, the feedback sensitivity measure may be based on how much feedback (from current followers) the candidate content creator has received and/or how much feedback (from current and, optionally, future followers) the candidate content creator is predicted to receive in the future. The higher the feedback sensitivity measure of a candidate content creator, the higher the candidate content creator will be ranked relative to other candidate content creators, all else being equal.

In an embodiment, a feedback sensitivity measure is based on a change in a likelihood or probability of a candidate content creator creating or providing content before an estimated amount of feedback that a candidate follower might provide and after that estimated amount of feedback. For example:

$$FSM_j = (pCreate(E_{fb} + \Delta_{fb}) - pCreate(E_{fb}))/\Delta_{fb}$$

where pCreate( ) is a model that predicts the likelihood of a candidate content creator j creating content in the future, $E_{fb}$ is input to the model and represents an estimated amount of feedback that the candidate content creator is expected to receive based on past feedback history for the candidate content creator, and $\Delta_{fb}$ represents an additional amount of feedback (e.g., an additional like, comment, share) that the candidate follower could provide if the candidate follower follows the candidate content creator. Thus, the above equation represents how much the probability of the candidate content creator to create content would change with an additional follower. If the change is relatively small, then, all else being equal, the score for the candidate content creator will be relatively small. Conversely, if the change is relatively large, then, all else being equal, the score for the candidate content creator will be relatively large.

The value of $\Delta_{fb}$ may depend on the expected amount of feedback the candidate content creator is expected to receive. A candidate content creator with a high amount of expected feedback will use a relatively large $\Delta_{fb}$ in the feedback sensitivity calculation because the change in probability of creation will be smaller when the expected amount of feedback is high. The set of $\Delta_{fb}$ values may be preselected such that each $\Delta_{fb}$ step has a measurable amount of change in probability of creation.

Content Creation Predictor

In an embodiment, the model for pCreate is implemented by content creation predictor 146. Content creation predictor 146 may implement a rules-based model or a machine-learned model. Example factors or features that content creation predictor 146 takes into account to generate the prediction include attributes of the candidate content creator (e.g., a job title of the candidate content creator) and a number of one or more types of feedback received in the past pertaining to content provided by the candidate content creator. For example, if a candidate content creator has received twenty instances of feedback two weeks ago and eighteen instances of feedback one week ago, then content creation predictor 146 may predict that the candidate content creator will receive sixteen instances of feedback in the current week.

In addition to past creation history of a candidate content creator, other example factors or features that content creation predictor 146 takes into account include a connection network size of the candidate content creator and session history of the candidate content creator. Examples of session history include number of sessions, number of sessions over different periods of time (such as past day, past week, past two weeks, past four weeks), number of sessions through different channels (e.g., desktop or mobile device), and average or median length of each session.

If content creation predictor 146 implements a machine-learned model, then the training data that is used to generate the machine-learned model comprises multiple training instances or samples, each of which correspond to a candidate content creator. Thus, a training instance includes one or more attributes of a candidate content creator and a number or amount of one or more types of feedback received in the past pertaining to content provided by the candidate content creator.

Previous creation data is used as a label or dependent variable. Such previous creation data may be a single value, such as a 0 or a 1: 1 indicating that the candidate content creator provided content (e.g., during a particular period of time, such as the last week), and 0 indicating that the candidate content creator did not provide content.

When training a model based on the training data, coefficients or weights are learned for the different features of the model. Thereafter, given values for attributes of a candidate content creator, the machine-learned model computes a prediction (or probability) of the candidate content creator providing to content to server system 130. Thus, the prediction is individualized to the candidate content creator in question.

Score Generator

Score generator 148 takes output from multiple predictors/generators and generates a score for a candidate content creator. For example, input to score generator 148 includes output from downstream interaction predictor 140, output from response predictor 142, and output from feedback sensitivity generator 144 (which may take output from content creation predictor 146 as input). An example formula for generating a score may be as follows:

$$\alpha EDSI_{i,j} + \beta pResponse_{i,j} * [(pCreate(E_{fb} + \Delta_{fb}) - pCreate(E_{fb}))/\Delta_{fb}]$$

The number of scores that score generator 148 generates for a potential follower at one particular time depends on the number of candidate content creators that are considered. For example, if there are ten candidate content creators for a single viewer/potential follower, then score generator 148 generates ten scores.

Candidate Entity Selector

Candidate entity selector 150 selects a candidate content creator from among multiple candidate content creators based on scores generated by score generator 148. The number of candidate content creators selected may depend on the screen size of a computing device of the viewer, or user to which the candidate content creators will be presented. For example, if the screen size is small, then the number of selected candidate content creators may be four; whereas if the screen size is large, then the number of selected candidate content creators may be ten.

The one or more criteria for selecting a candidate content creator may be the scores generated by score generator 148; thus, the candidate content creator with the highest score will be selected. If the number of candidate content creators to select is N, then the N candidate content creators with the highest scores are selected.

Additionally or alternatively, other criteria may be used to select a candidate content creator. For example, if a candidate content creator is a connection of a connection of the viewer/potential follower, then that candidate content creator is automatically selected, as long as the score for the candidate content creator is above a minimum threshold value.

Presentation Component

Presentation component 152 receives a set of candidate content creators (or listings thereof) from candidate entity selector 150 and includes each listing in a slot of web content based on the scores associated with the candidate content creators. Presentation component 152 includes, in a slot, (a) the actual listing (e.g., image and text) of the candidate content creator assigned to the slot or (b) a reference to the actual content. If (b), then the computing device that receives the reference uses the reference to retrieve the actual content from a remote source, such as a content delivery network (CDN).

Presentation component 152 may also organize content that is received from sources other than candidate entity selector 150. For example, in the context of a web page, presentation component 152 determines a pre-defined format of the web page, where different portions of the web page correspond to different sources. Presentation component 152 inserts content from the different sources (or references to the content) into the appropriate portions of the web page, according to the pre-defined format.

Presentation component 152 causes the organized content (including the set of selected candidate content creator listings) to be transmitted over a computer network (e.g., network 120) to a computing device (e.g., client 112) of the viewer/potential follower. The organized content may come in the form of an HTML or XHTML page.

Example User Interfaces

Figure 2A:
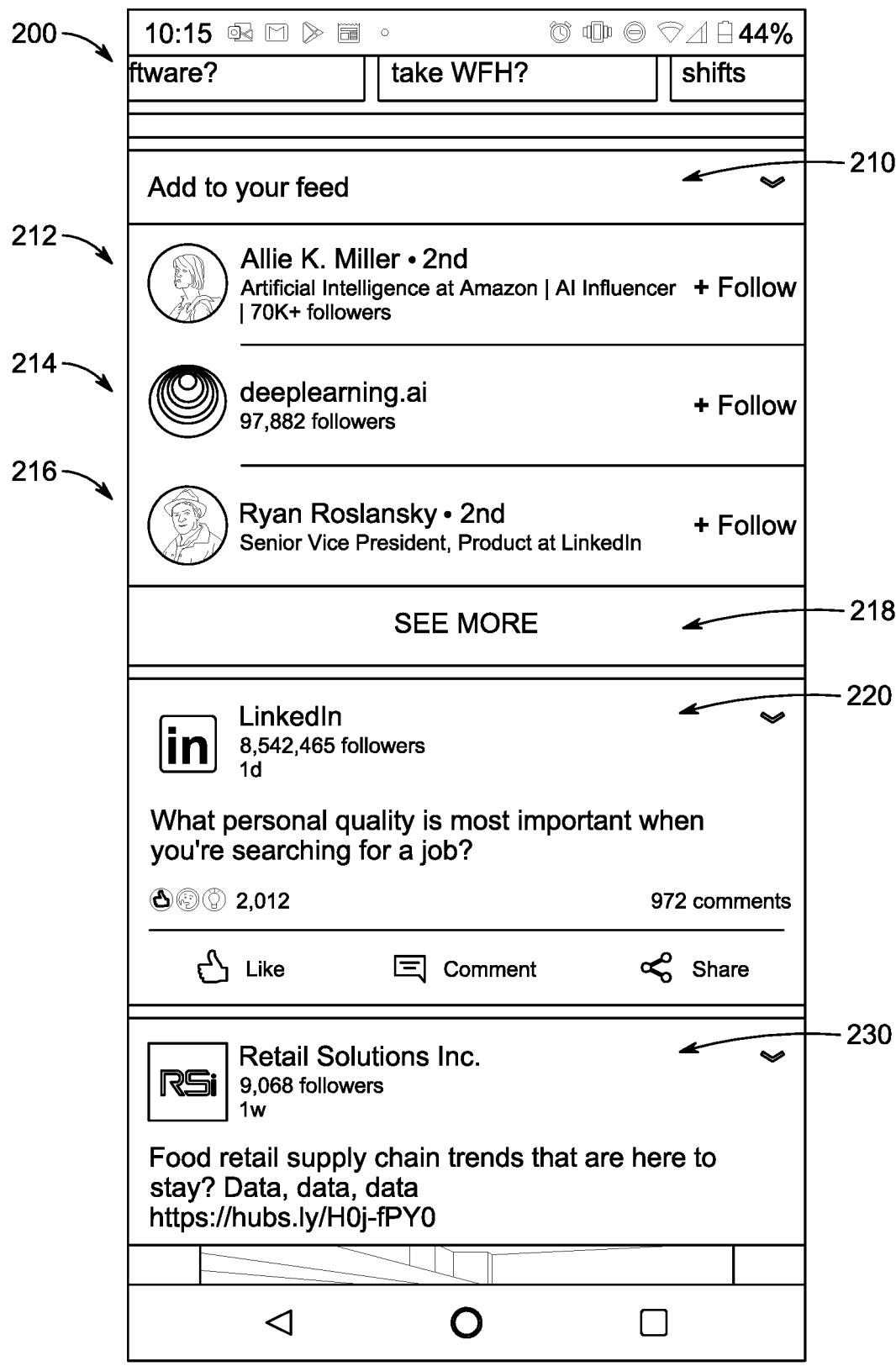
FIGS. 2A-2B are screenshots of an example user interface for presenting follow recommendations, in an embodiment.

FIG. 2A is a screenshot of an example user interface 200 on a computing device (e.g., a smartphone) with a relatively small display screen, in an embodiment. User interface 200 comprises a follow suggestion section 210 and content items 220 and 230. Follow suggestion section 210 comprises three follow suggestions or recommendations, each involving a different candidate content creator. Two of the candidate content creators are people (212 and 216) and the other candidate content creator is a hashtag (214). Each follow suggestion includes a name of the candidate content creator and other information, such as a job title, profile picture, and employer (212 and 216) (which information may come from a user profile of the respective candidate content creator) and an indication of the current number of followers (212 and 214). Each follow suggestion also includes a "+Follow" button that, if selected, causes the viewer to be a follower of the corresponding candidate content creator. Such "following" may involve updating a network graph that adds a directed edge between the follower and the content creator and that points from the follower to the content creator. Follow suggestion section 210 also includes a button 218 that, if selected by the viewer, causes the user interface to be updated to present additional follow suggestions corresponding to additional candidate content creators.

Content item 220 and 230 may be considered sponsored content items or advertisements from existing/current follow connections of the viewer.

Figure 2B:
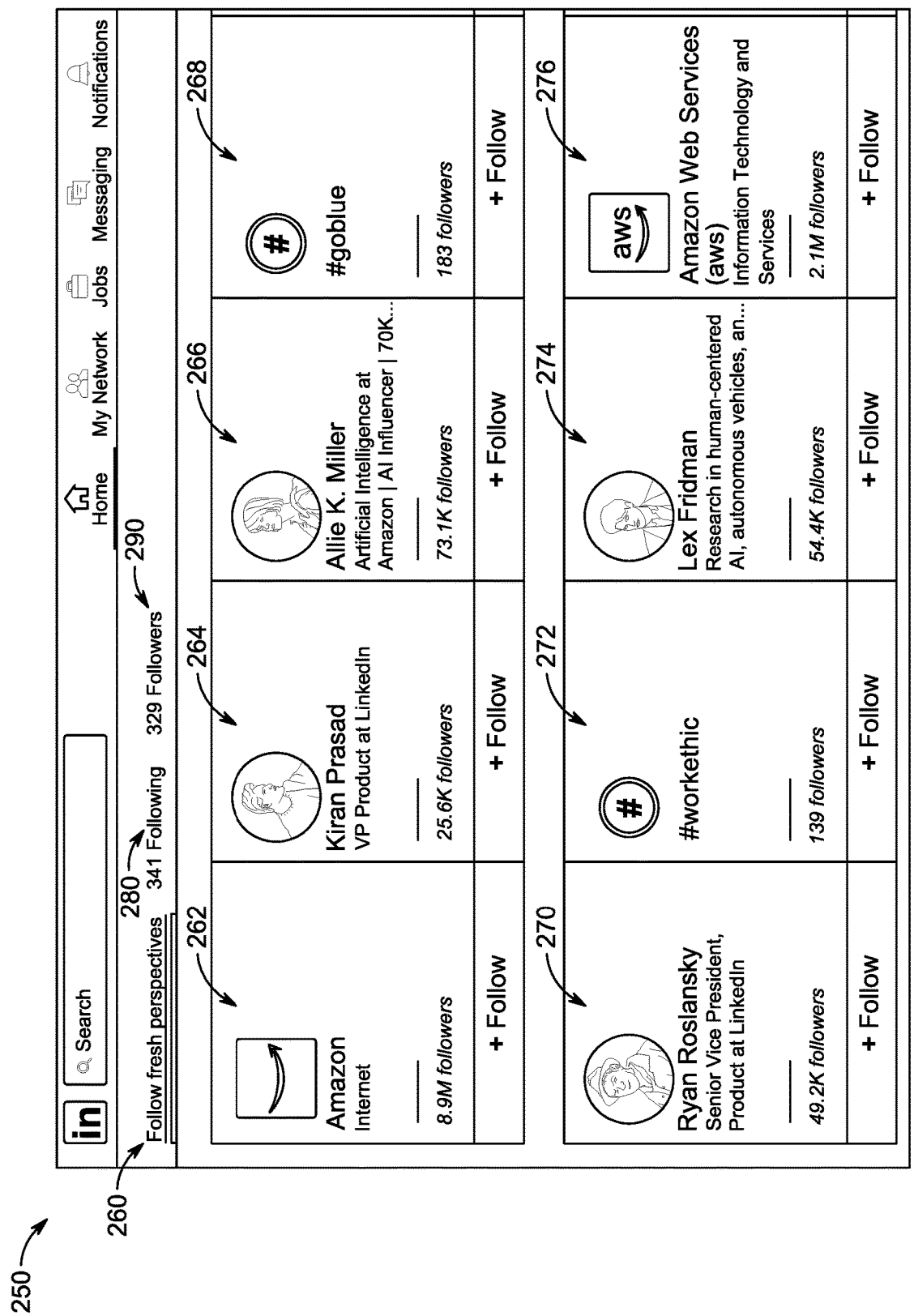

FIG. 2B is a screenshot of an example user interface 250 on a computing device (e.g., a desktop computer) with a relatively large display screen, in an embodiment. User interface 250 comprises a follow suggestion tab 260 that is currently selected. When follow suggestion tab 260 is currently selected, eight follow suggestions or recommendations are presented in user interface 250, each suggestion involving a different candidate content creator. Four of the candidate content creators are people (264, 266, 270, and 274), one is a company (262), two are hashtags (268 and 272), and one is a product (276). Each follow suggestion includes a name of the candidate content creator and an indication of the current number of followers. Each follow suggestion also includes a "+Follow" button that, if selected, causes the viewer to be a follower of the corresponding candidate content creator. Such "following" may involve updating a network graph that adds a directed edge between the follower and the content creator and that points from the follower to the content creator.

User interface 250 also a following tab 280 and a follower tab 290. Following tab 280 indicates a number of content creators (or followees) that the viewer follows, while follower tab 290 indicates a number of entities (e.g., people) who follow the viewer. Selection of following tab 280 causes user interface 250 to be updated to include at least a subset of the content creators that the viewer follows and, optionally, an ability to scroll and view all such content creators. Such a view of followees may be accompanied with an (e.g., visual) option (e.g., adjacent to each followee) to un-follow the followee. In other words, the viewer may provide input that causes an edge (in a network graph) that corresponds to the viewer and followee to be deleted.

Similarly, selection of follower tab 290 causes user interface 250 to be updated to include at least a subset of the entities who follow the viewer and, optionally, an ability to scroll and view all such entities. Such a view of followers may be accompanied with an (e.g., visual) option (e.g., adjacent to each follower) to delete the follow connection with the follower. In other words, the viewer may provide input that causes an edge (in a network graph) that corresponds to the viewer and follower to be deleted.

Example Process

Figure 3:
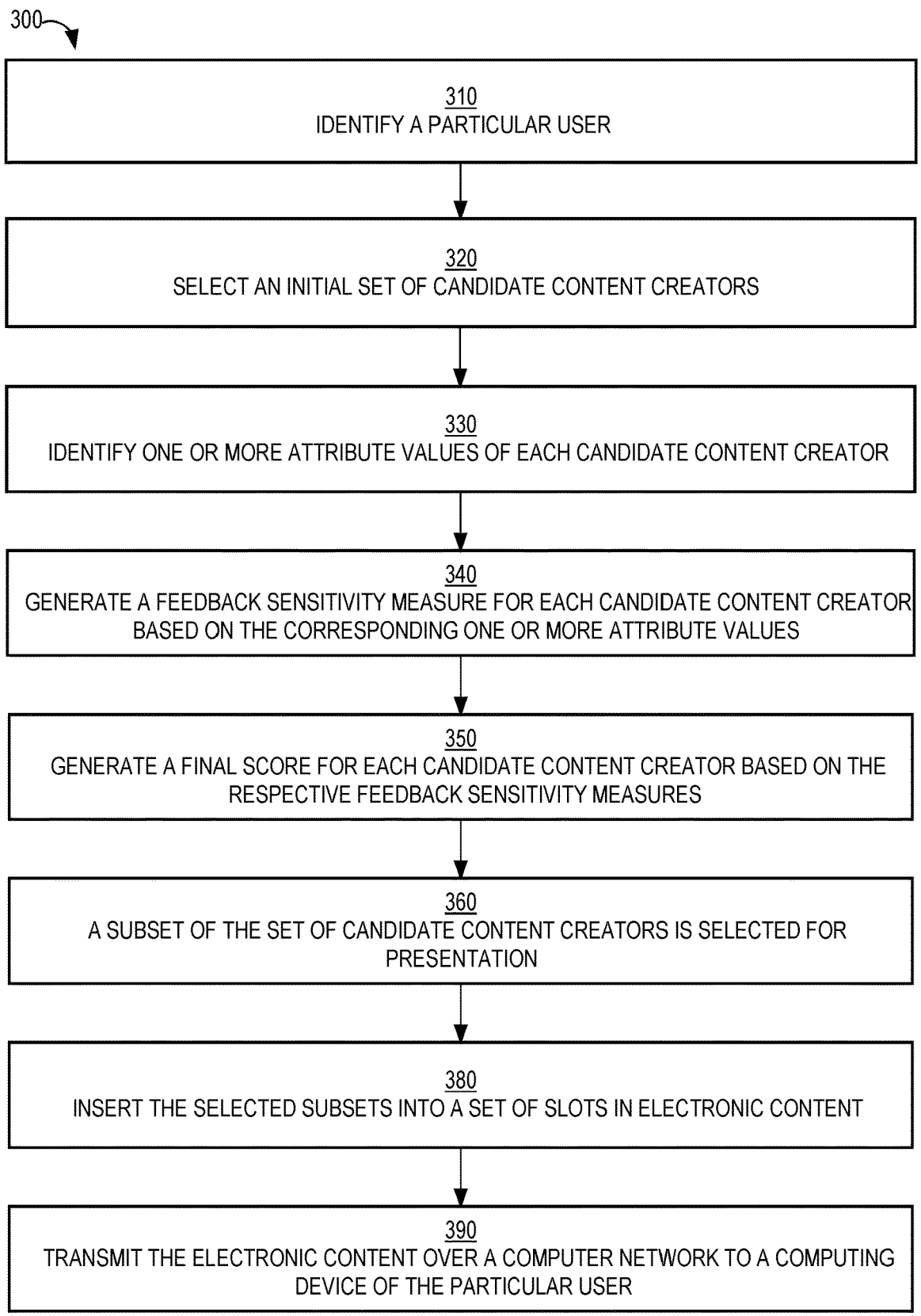
FIG. 3 is a flow diagram that depicts an example process for providing recommendations of candidate content creators, in an embodiment.

FIG. 3 is a flow diagram that depicts an example process 300 for providing recommendations of candidate content creators, in an embodiment. Process 300 may be implemented by one or more elements of server system 130.

At block 310, a particular user is identified. Block 310 may be performed by viewer identification component 134. Block 310 may be initiated in response to a content request that the particular user initiates with his/her computing device. For example, the particular user may select a software icon representing a client (e.g., native) application that is installed on the particular user's smartphone, which selection causes the client application to launch and a home page to be presented, which home page includes a recommended entity section. Alternatively, block 310 may be initiated regularly after the passage of a certain amount of time or after the completion of process 300, which may be executed on a periodic basis (e.g., daily).

At block 320, an initial set of candidate content creators is selected. The selection may be all current content creators who are not yet followees of the particular user.

Alternatively, the selection may be all current content creators who are not yet followees of the particular user and satisfy one or more other criteria. An example of such other criteria includes a topic match between (1) content that a candidate content creator provided in the past and (1a) content that the particular user has requested or viewed in the past (e.g., the last month) and/or (1b) an explicit topic preference that the particular user has selected (e.g., during registration or, optionally, during a different view). Another example of such other criteria includes that the candidate content creator must be followed by a current connection (or "friend") of the particular user.

At block 330, one or more attribute values of each candidate content creator identified. The attribute values may come from an online profile database, which may be part of entity database 132, and/or from event logging database 138. A user or other identifier associated with the candidate content creator is used to look up a record or profile in the respective databases.

At block 340, a feedback sensitivity measure is generated for each candidate content creator based on the identified attribute values. Block 340 may be performed by feedback sensitivity generator 144. For example, feedback sensitivity generator 144 considers only the amount (and, optionally, type) of previous feedback that each candidate content creator received for their respective content: the lower the amount of previous feedback received, the higher the feedback sensitivity measure; the higher the amount of previous feedback received, the lower the feedback sensitivity measure. Alternatively, block 340 may involve content creation predictor 146 that considers additional attributes/features of each candidate content creator and inputs the corresponding feature values of a candidate content creator into a machine-learned model, which generates one or more scores that are used to generate the feedback sensitivity measure for the candidate content creator.

At block 350, a final score is generated for each candidate content creator based on the respective feedback sensitivity measures. Block 350 may be performed by score generator 148. Block 350 may involve considering, for each candidate content creator, a likelihood that the particular user (i.e., viewer/potential follower) will provide feedback to content that the candidate content creator might provide or has provided. Such a likelihood or probability may be determined by response predictor 142. The likelihood/probability is then combined with (e.g., multiplied by) the feedback sensitivity measure generated in block 340 to produce a product that is used to generate the final score.

Block 350 may also involve predicting an estimated amount/number of downstream interactions between the particular user and each candidate content creator if the particular user chose to follow the candidate content creator. Such a prediction may be made by downstream interaction predictor 140 and, if computed, is combined with (e.g., added to) the product described above.

At block 360, a subset of the set of candidate content creators is selected for presentation. The number of candidate entities in the subset may depend on the size of the display screen of the computing device of the particular user. For example, if the computing device is a smartphone, then the top three ranked (based on score) candidate content creators are selected. If the computing device is a laptop with a screen size of thirteen inches, then the top eight ranked candidate content creators are selected. Block 360 may be performed by candidate entity selector 150.

At block 370, the selected subset is inserted into a set of slots in electronic content. Insertion may involve including content associated with each selected candidate content creator in a slot or including a reference to the content in the slot. Thereafter, when the electronic content is processed on a client device, the client device (e.g., a web browser, or a native application, executing thereon) returns the content using the corresponding reference. After insertion, the electronic content includes the selected subset (and/or references to the individual selected candidate content creators). Block 370 may be performed by presentation component 152.

At block 380, the electronic content that includes the selected subset is transmitted to a computing device of the particular user to be displayed thereon. For example, presentation component 152 transmits the electronic content over a computer network to the computing device, which causes the selected subset to be presented on a display screen of the computing device. Block 380 may be triggered when the particular user visits a website (or logs into an account of the particular user) hosted by server system 130.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
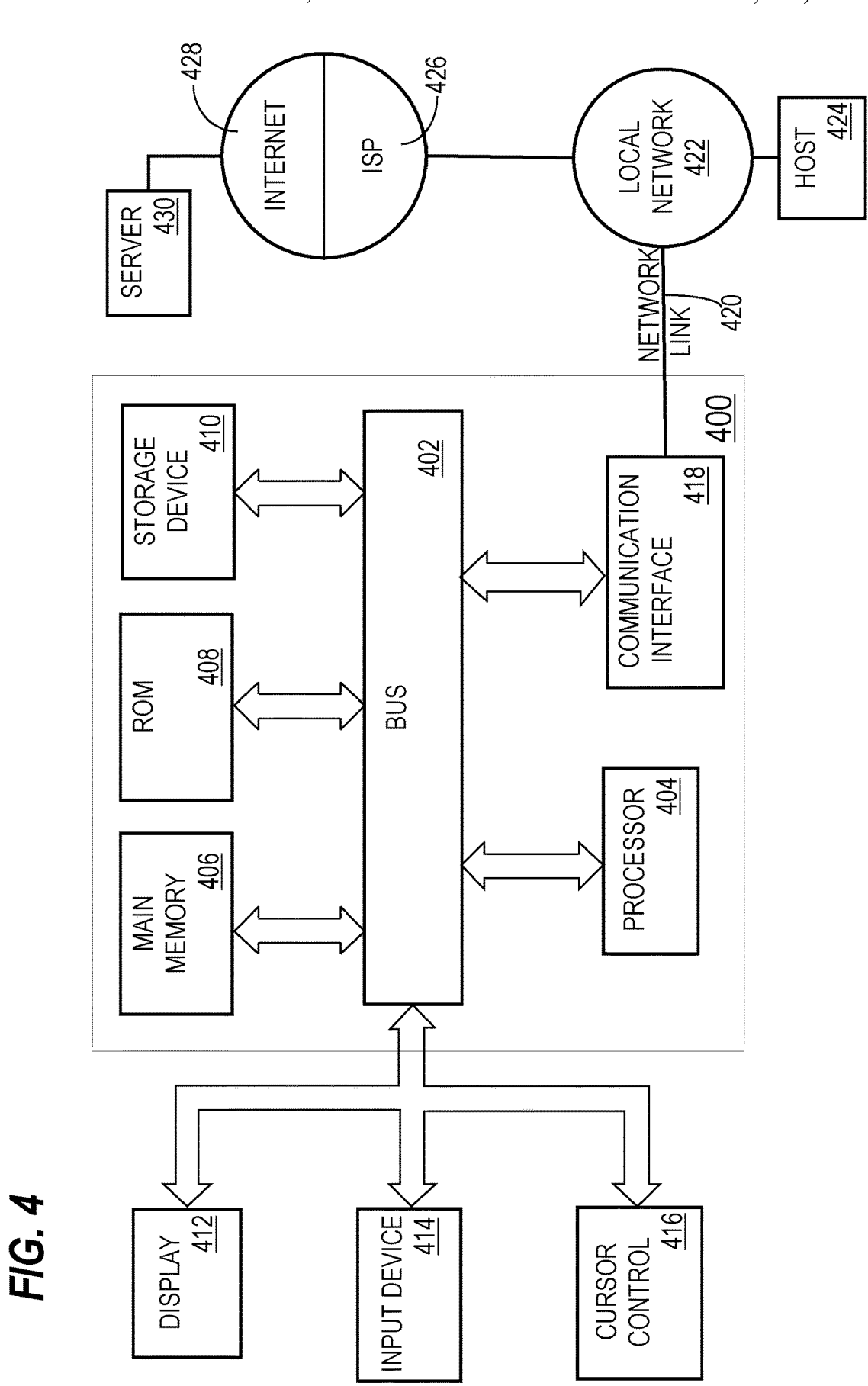
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying a particular user;
    based on one or more attributes of the particular user, identifying a plurality of entities;
    for each entity in the plurality of entities:
        determining a feedback sensitivity measure of content creation of the entity, wherein the feedback sensitivity measure is generated based on an amount of feedback, from other users, to content that the entity has created, and wherein generating the feedback sensitivity measure comprises using a machine-learned model to generate a first prediction of the entity creating future content given expected feedback;
        generating a score for the entity based on the feedback sensitivity measure;
    determining a ranking of the plurality of entities based on the score of each entity in the plurality of entities;
    selecting a subset of the plurality of entities based on the ranking;
    causing the subset of the plurality of entities to be presented on a computing device of the particular user;
    wherein the method is performed by one or more computing devices.

2. The method of claim 1, further comprising:
    using a second machine-learned model to generate a prediction of the particular user providing feedback to content produced by the entity;
    wherein generating the score for the entity is also based on the prediction.

3. The method of claim 1, wherein generating the feedback sensitivity measure comprises:
    using the machine-learned model to generate:
        a second prediction of the entity creating the future content given the expected feedback and additional feedback from the particular user;
    wherein the feedback sensitivity measure is based on a difference between the first prediction and the second prediction.

4. The method of claim 1, further comprising:
    using a machine-learned model to generate an expected amount of downstream interaction between the particular user and the entity if the particular user elects to follow the entity;
    wherein generating the score for the entity is also based on the expected amount of downstream interaction.

5. The method of claim 1, further comprising:
    using a machine-learned model to generate a prediction of the particular user electing to follow the entity;
    wherein generating the score for the entity is also based on the prediction.

6. The method of claim 3, wherein the machine-learned model is based on a plurality of features that includes a feature that is based on one or more of: a network size of the entity, session history of the entity, and past creation history of the entity.

7. The method of claim 6, wherein the machine-learned model is based on a plurality of features, a first subset of which pertain to attributes of the particular user and a second subset of which pertain to attributes of the entity.

8. One or more storage media storing instructions which, when executed by one or more processors, cause:
    identifying a particular user;
    based on one or more attributes of the particular user, identifying a plurality of entities;
    for each entity in the plurality of entities:
        determining a feedback sensitivity measure of content creation of the entity, wherein the feedback sensitivity measure is generated based on an amount of feedback, from other users, to content that the entity has created, and wherein generating the feedback sensitivity measure comprises using a machine-learned model to generate a first prediction of the entity creating future content given expected feedback;
        generating a score for the entity based on the feedback sensitivity measure;
    determining a ranking of the plurality of entities based on the score of each entity in the plurality of entities;
    selecting a subset of the plurality of entities based on the ranking;
    causing the subset of the plurality of entities to be presented on a computing device of the particular user.

9. The one or more storage media of claim 8, wherein the instructions, when executed by the one or more processors, further cause:
    using a second machine-learned model to generate a prediction of the particular user providing feedback to content produced by the entity;
    wherein generating the score for the entity is also based on the prediction.

10. The one or more storage media of claim 8, wherein generating the feedback sensitivity measure comprises:
    using the machine-learned model to generate:
        a second prediction of the entity creating the future content given the expected feedback and additional feedback from the particular user;
    wherein the feedback sensitivity measure is based on a difference between the first prediction and the second prediction.

11. The one or more storage media of claim 8, wherein the instructions, when executed by the one or more processors, further cause:
    using a machine-learned model to generate an expected amount of downstream interaction between the particular user and the entity if the particular user elects to follow the entity;

wherein generating the score for the entity is also based on the expected amount of downstream interaction.

12. The one or more storage media of claim 8, wherein the instructions, when executed by the one or more processors, further cause:
    using a machine-learned model to generate a prediction of the particular user electing to follow the entity;
    wherein generating the score for the entity is also based on the prediction.

13. The one or more storage media of claim 10, wherein the machine-learned model is based on a plurality of features that includes a feature that is based on one or more of: a network size of the entity, session history of the entity, and past creation history of the entity.

14. The one or more storage media of claim 12, wherein the machine-learned model is based on a plurality of features, a first subset of which pertain to attributes of the particular user and a second subset of which pertain to attributes of the entity.

15. A system comprising:
    one or more processors;
    one or more non-transitory storage media storing instructions which, when executed by one or more processors, cause:
        identifying a particular user;
        based on one or more attributes of the particular user, identifying a plurality of entities;
        for each entity in the plurality of entities:
            determining a feedback sensitivity measure of content creation of the entity, wherein the feedback sensitivity measure is generated based on an amount of feedback, from other users, to content that the entity has created, and wherein generating the feedback sensitivity measure comprises using a machine-learned model to generate a first prediction of the entity creating future content given expected feedback;
            generating a score for the entity based on the feedback sensitivity measure;
        determining a ranking of the plurality of entities based on the score of each entity in the plurality of entities;
        selecting a subset of the plurality of entities based on the ranking;
        causing the subset of the plurality of entities to be presented on a computing device of the particular user.

16. The system of claim 15, wherein the instructions, when executed by the one or more processors, further cause:
    using a second machine-learned model to generate a prediction of the particular user providing feedback to content produced by the entity;
    wherein generating the score for the entity is also based on the prediction.

17. The system of claim 15, wherein generating the feedback sensitivity measure comprises:
    using the machine-learned model to generate:
        a second prediction of the entity creating the future content given the expected feedback and additional feedback from the particular user;
    wherein the feedback sensitivity measure is based on a difference between the first prediction and the second prediction.

18. The system of claim 15, wherein the instructions, when executed by the one or more processors, further cause:
    using a machine-learned model to generate an expected amount of downstream interaction between the particular user and the entity if the particular user elects to follow the entity;
    wherein generating the score for the entity is also based on the expected amount of downstream interaction.

19. The system of claim 15, wherein the instructions, when executed by the one or more processors, further cause:
    using a machine-learned model to generate a prediction of the particular user electing to follow the entity;
    wherein generating the score for the entity is also based on the prediction.

20. The system of claim 17, wherein the machine-learned model is based on a plurality of features that includes a feature that is based on one or more of: a network size of the entity, session history of the entity, and past creation history of the entity.

* * * * *